United States Patent [19]

Loeffler

[11] 3,865,540
[45] Feb. 11, 1975

[54] PURGING SYSTEM AND METHOD FOR A PROCESS PRODUCING GLASS FIBER BLANKETS

[75] Inventor: Romain Eugene Loeffler, Defiance, Ohio

[73] Assignee: Johns Manville Corporation, Greenwood Village, Colo.

[22] Filed: Apr. 27, 1973

[21] Appl. No.: 355,356

[52] U.S. Cl. ............... 432/2, 34/16, 34/26, 34/155, 65/3, 118/50, 118/68, 432/8, 432/72
[51] Int. Cl. ............................................. C03c 25/02
[58] Field of Search ............ 65/3, 9, 11 R; 118/63, 118/67, 68, 50; 34/27, 16, 32, 155, 26; 432/72, 2, 8

[56] References Cited
UNITED STATES PATENTS

| 2,373,077 | 4/1945 | Kleist ........................... 65/11 R X |
| 2,958,919 | 11/1960 | Palmer ........................... 65/11 R X |
| 3,429,681 | 2/1969 | Krakauer et al. ..................... 65/9 |
| 3,447,247 | 6/1969 | Daane ............................. 34/155 X |
| 3,509,633 | 5/1970 | MacLeod ........................... 34/155 X |
| 3,539,316 | 11/1970 | Trethewey ........................... 65/9 X |

Primary Examiner—Robert L. Lindsay, Jr.
Attorney, Agent, or Firm—Robert M. Krone; John D. Lister

[57] ABSTRACT

A binder impregnated glass fiber blanket is cured and shaped by passing the blanket through a series of spaced-apart heated platen assemblies. The curing of the blanket produces vapors, fumes, odors and other pollutants which must be prevented from escaping to the surroundings of the platen assemblies. Consequently, these gases are purged from the blanket as the blanket passes between adjacent platen assemblies. Hot air is introduced from a plenum chamber onto one side of the blanket. The hot air and pollutants from the binder are drawn through and from the blanket by a suction chamber on the opposite side of the blanket. The gases from the suction chamber are then passed through an air filler and discharged to the atmosphere.

13 Claims, 6 Drawing Figures

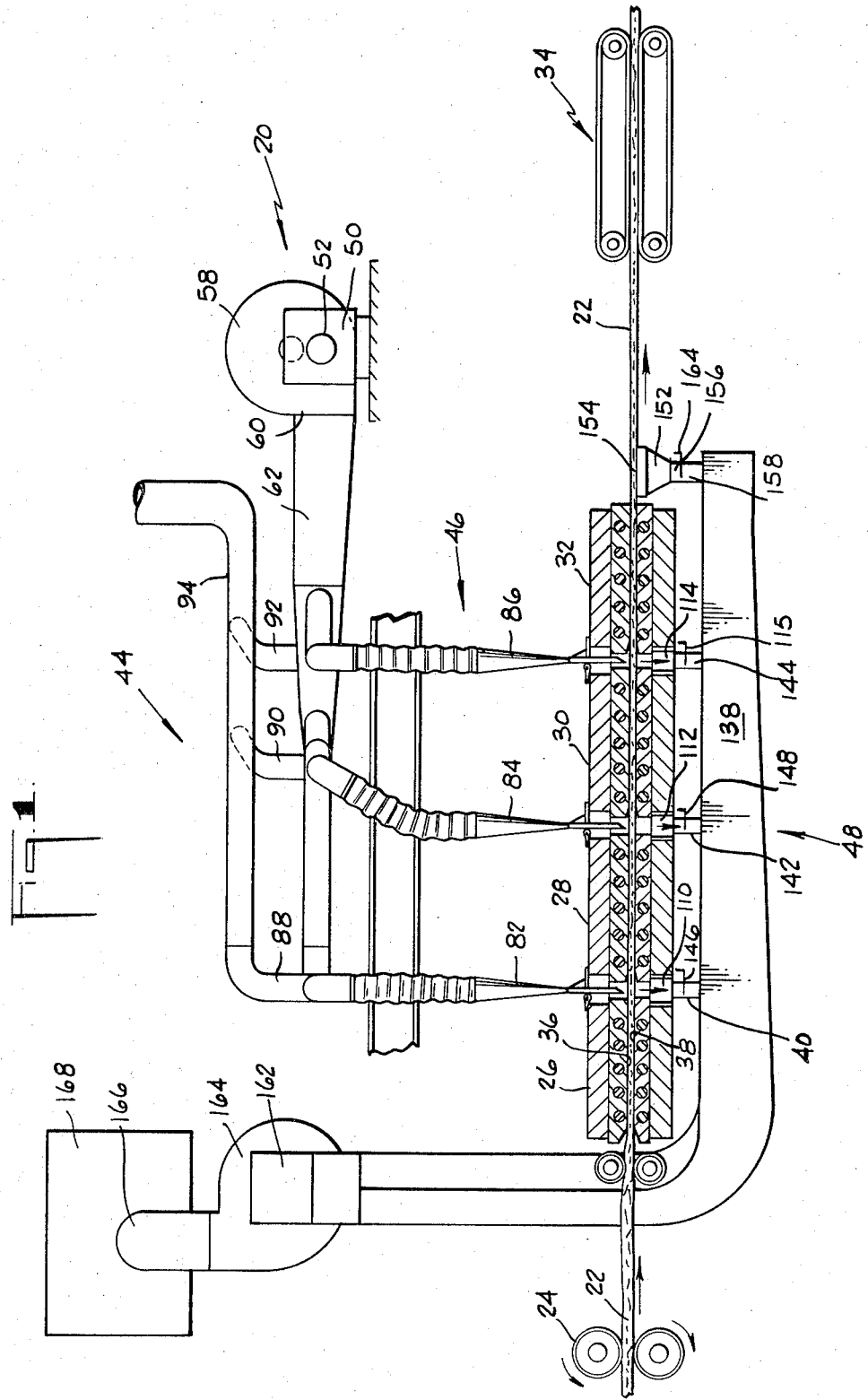

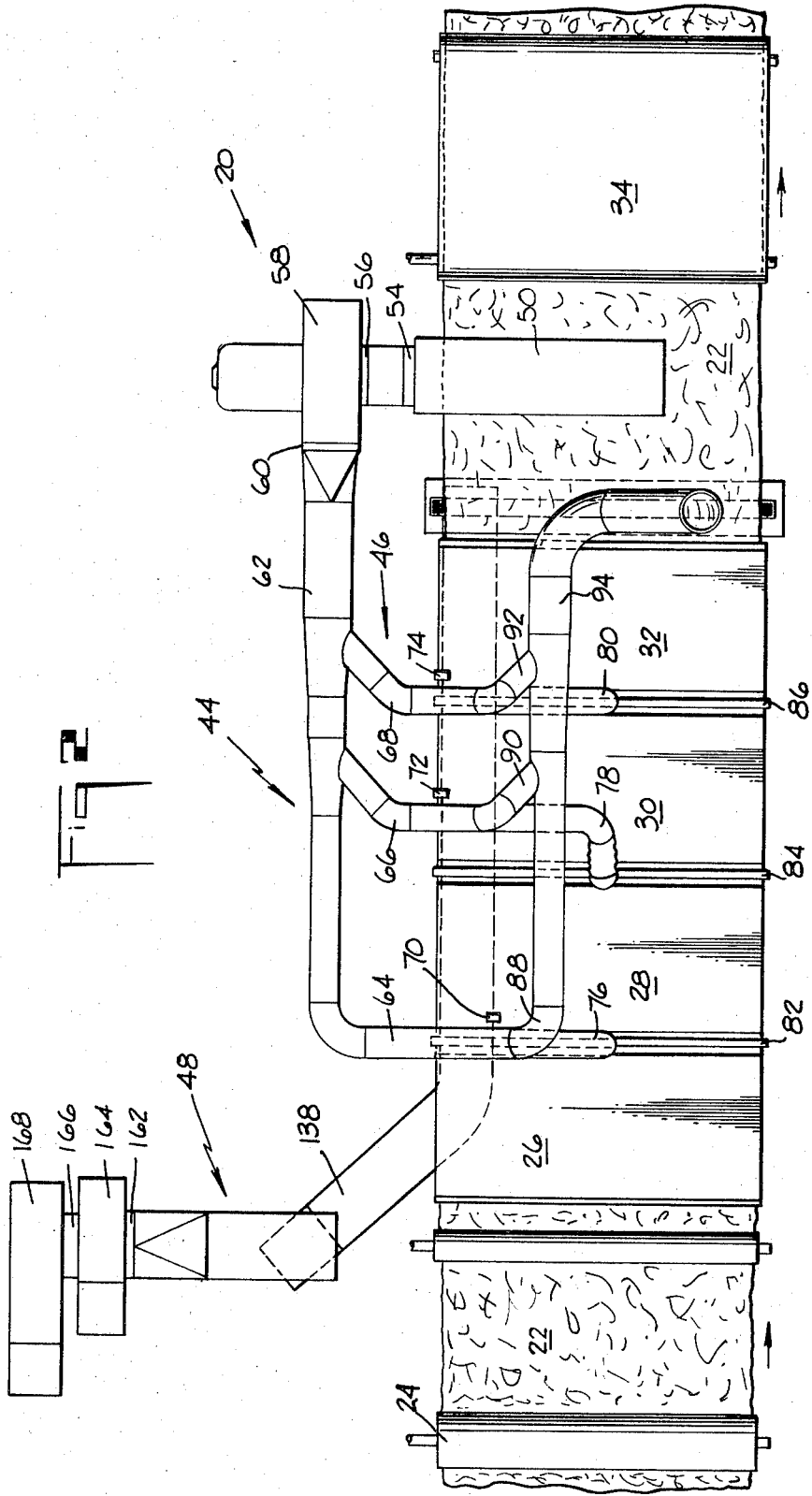

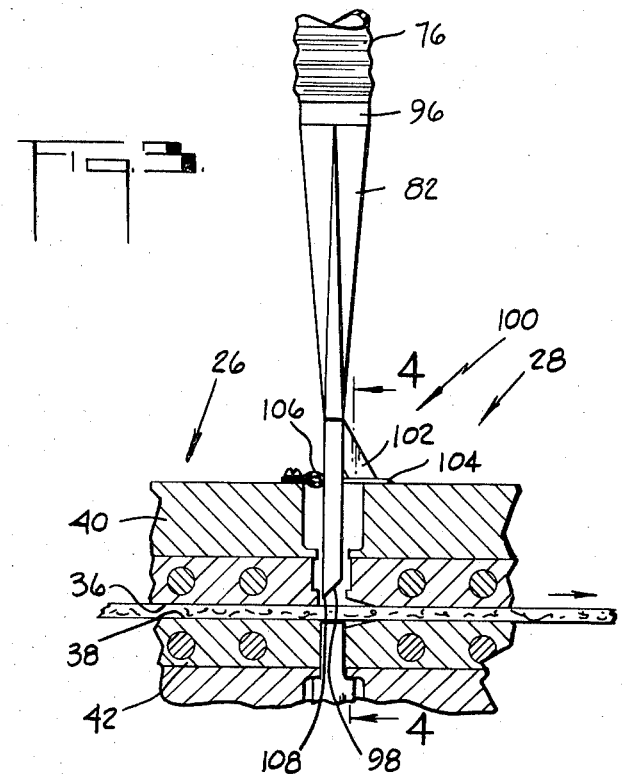
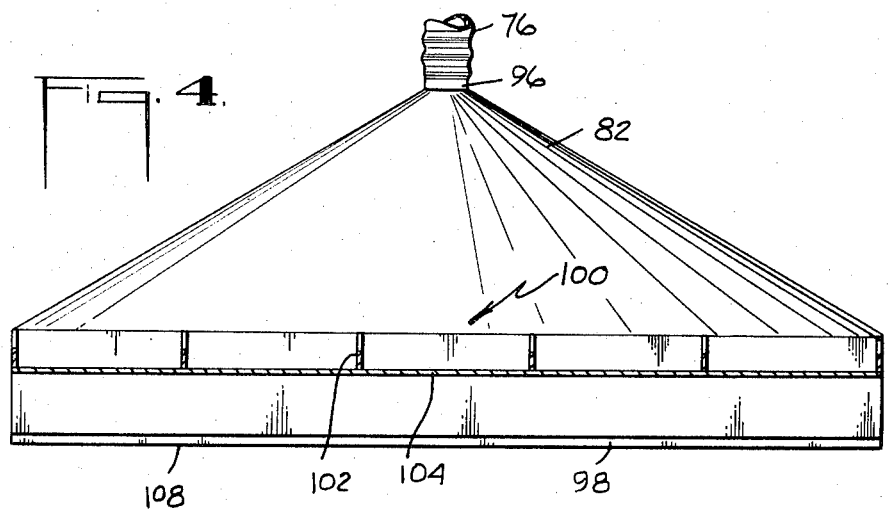

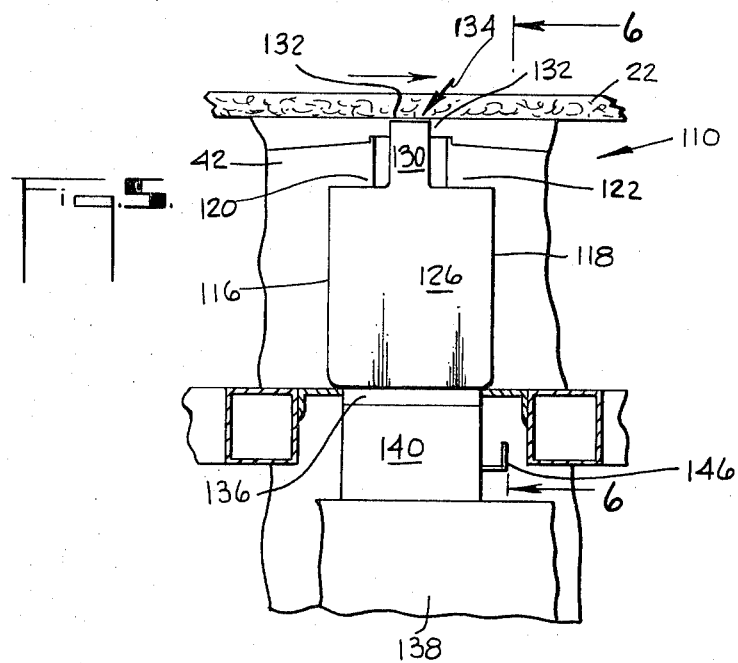
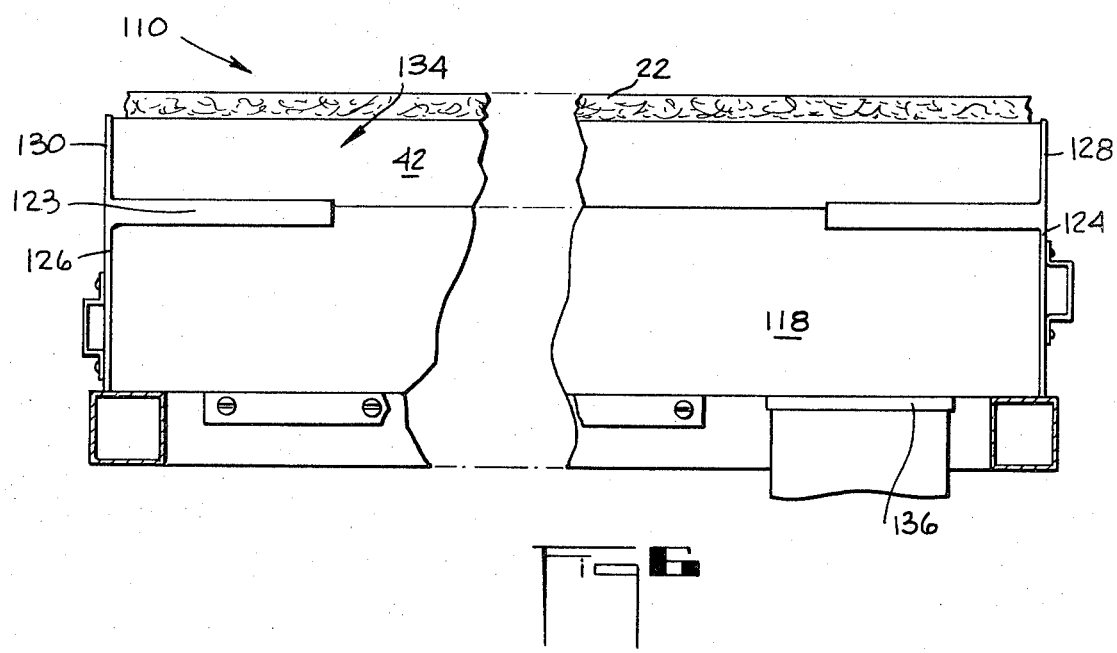

PURGING SYSTEM AND METHOD FOR A PROCESS PRODUCING GLASS FIBER BLANKETS

BACKGROUND OF THE INVENTION

The present invention is directed to an apparatus and method for purging pollutants from a glass fiber blanket and in particular to an apparatus and method for purging pollutant gases from a process wherein the blanket is passed through a series of spaced apart heated platen assemblies.

Certain continuous processes produce a glass fiber blanket by pulling a binder impregnated uncured glass fiber blanket through a series of heated platens which cure the mat and control the mat thickness through contact between the blanket and the platens. This curing process vaporizes the moisture and other volatile components of the binder thereby producing fumes and odors. Previously, the fumes and odors were released to the surrounding atmosphere and there the fumes and odors were collected by a large suction hood over the platen assemblies. This method requires the handling of large quantities of air, e.g., 30,000 cubic feet per minute if most of the fumes and odors are to be collected.

BRIEF SUMMARY OF THE INVENTION

It is an object of the present invention to provide a purging apparatus and method for removing gaseous pollutants from a glass fiber blanket or mat that are produced during the curing of the mat.

It is an object of the present invention to provide an apparatus and method which greatly reduce the volume of gases that must be handled to effect the purging of such a blanket or mat, e.g., about 6,000 cubic feet per minute for a purging operation which previously required about 30,000 cubic feet per minute.

It is a further object of the present invention to provide a purging apparatus and method which can pass hot air through the blanket to facilitate the cure of the blanket and the purging of gaseous pollutants from the blanket.

The present invention is directed to an apparatus and method to be employed in a process wherein a binder impregnated glass fiber blanket is cured and shaped by passing the blanket through a series of spaced apart heated platen assemblies. The gaseous pollutants produced by the curing of the blanket are removed from the blanket as the blanket passes between successive platen assemblies The removal of the gases and a further curing of the blanket is effected by introducing air, which may be heated, to one side of the blanket and by drawing the air along with the gases produced in the curing operation through and from the blanket after which the air and the gases are passed through a filter and the cleaned effluent discharged to the atmosphere. The air is introduced to the blanket from plenum chambers located between adjacent platen assemblies and the air and gases are removed from the blanket by suction chambers located between adjacent platen assemblies. The rate of withdrawal of the air and the gases from the area between the platen assemblies plus the partial enclosure of the area assures that practically no gaseous or other pollutants from the blanket escape to the surroundings.

BRIEF DESCRIPTION OF THE DRAWINGS

FIG. 1 is a side elevational view of an apparatus of the present invention with portions of the support structure omitted to better illustrate the invention;

FIG. 2 is a plan view of an apparatus of the present invention with portions of the support structure omitted to better illustrate the invention;

FIG. 3 is an enlarged fragmentary view of an apparatus of the present invention illustrating a plenum chamber of the present invention and its position relative to adjacent platen assemblies;

FIG. 4 is a view of a plenum chamber of the present invention taken substantially along lines 4—4 of FIG. 3;

FIG. 5 is an enlarged fragmentary view of a portion of an apparatus of the present invention illustrating a suction chamber of the present invention and its position relative to adjacent platen assemblies; and FIG. 6 is a view taken substantially along lines 6—6 of FIG. 5 to further illustrate a suction chamber of the present invention.

DETAILED DESCRIPTION AND PREFERRED EMBODIMENTS

FIGS. 1 and 2 illustrate a curing station provided with a pull-through apparatus generally designated by a reference numeral 20 for curing and shaping a binder impregnated glass fiber blanket 22. The mat or blanket 22 is fed from a collection chamber or other source through a pair of searing rolls 24. After passing through the searing rolls 24, the blanket 22 is introduced into a series of heated platen assemblies 26, 28, 30 and 32. After the blanket exits from the last platen assembly 32, it passes between a pair of endless pull-through conveyors 34 or other pull-through apparatus for drawing the blanket through the series of heated platens 26, 28, 30 and 32. The blanket is delivered from the pull-through conveyors 34 to other process stations or to a packaging station (not shown).

The heated platen assemblies 26, 28, 30 and 32 each include an upper and a lower heated platen. The platens are heated by conventional means, such as, electrical resistance heaters, which are embedded in the platens to provide sufficient heat to cure the resinous binder of the blanket. While platen assemblies similar to those disclosed in the U.S. Pat. to Terry et al. No. 3,583,030 issued June 8, 1971 are preferred, it is to be understood that other types of curing assemblies can be substituted for assemblies 26, 28, 30 and 32. For example, instead of having stationary upper and lower opposing major surfaces 36 and 38, the upper and lower heated platens 40 and 42 of the platen assembly 26 as well as the other platen asemblies can be replaced by heated curing assemblies with endless conveyor belts. Furthermore, while the apparatus illustrated is designed to produce a blanket, mat, or sheet of material, the forming surfaces of the heated platens can be contoured to impart various cross-sectional configurations to the mat or blanket introduced into the curing station.

The pull-through apparatus 20 is provided with a purging system generally designated by a reference numeral 44. This purging system includes an air introduction system 46 for introducing air adjacent a major surface of the blanket 22. The air is introduced across the entire width of the blanket 22 as it passes between successive platen assemblies 26, 28, 30 and 32. The purging system 44 also includes an air and pollutant removal system 48 for drawing the air from the air introduction system through the blanket and for removing the air and the pollutants from the blanket for further treatment and discharge to the atmosphere.

The air introduction system 46 includes an air heater 50, e.g., a direct fired gas heater. The heater 50 has an inlet 52 that communicates with the atmosphere and an outlet 54 which is connected to an inlet 56 of a supply fan 58. The fan 58 draws air in through the heater 50 and discharges the heated air through its outlet 60 into a conduit 62. The conduit 62 is provided with a series of branch conduits 64, 66 and 68 which carry the air from the fan conduit 62 to a series of valve or damper assemblies 70, 72 and 74. The valve or damper assemblies 70, 72 and 74 divide the flow of the air in the lines 64, 66 and 68, directing a portion of the flow down through conduits 76, 78 and 80 which lead to plenum chambers 82, 84 and 86 respectively. The remainder of the flow is directed through conduits 88, 90 and 92 to an exhaust header 94 which discharges the air from the conduits 88, 90 and 92 to the atmosphere. With this arrangement, the flow of air to each plenum chamber 82, 84 and 86 can be individually regulated to obtain the proper flow of air from each of these plenum chambers.

All of the plenum chambers 82, 84 and 86 are identical in construction. Consequently, only the plenum chamber 82 which is shown in FIGS. 3 and 4, will be discussed in detail. The plenum chamber 82 is generally fan shaped expanding outwardly from an inlet 96 to an outlet 98. The outlet 98 is substantially the same width as the width of the blanket 22 being cured and shaped in the apparatus 20. As shown the plenum chamber 82 is mounted by means of a bracket assembly 100 on an upper surface of the upper platen of platen assembly 28. The bracket assembly includes gusset plate 102 which is welded to the plenum chamber and a plate 104 which extends the entire width of the plenum chamber. The plate 104 is welded or otherwise affixed to the upper platen of platen assembly 28 and provides a seal between the plenum chamber and the upper platen of platen assembly 28. The upper surface of platen assembly 26 is provided with tadpole sealing strip 106 which extends the entire width of the platen assembly to effect a seal between the upper platen 40 and the other side of the plenum chamber 82. The outlet 98 is a slot which extends the entire width of the plenum chamber and is inclined at an angle about 45° from the horizontal with the opening facing generally toward platen assembly 28. The lower edge 108 of the plenum chamber which defines one side of the outlet opening 98, is adjacent but above the plane of the blanket engaging surfaces of the upper platen assemblies 26 and 28 on either side of the plenum chamber 82.

The air and gas removal system 48 includes a series of suction chambers 110, 112 and 114 which are located between adjacent platen assemblies 26, 28, 30 and 32. The suction chambers 110, 112 and 114 are identical. Consequently, only the suction chamber 110 which is shown in FIGS. 5 and 6 will be discussed in detail. The suction chamber 110 comprises a pair of sidewalls 116 and 118 which extend the width of the lower platens of the adjacent platen assemblies 26 and 28. The sidewalls 116 and 118 extend upward into contact with or adjacent shoulders 120 and 122 of the adjacent platens to thereby effect a seal between the suction chamber and the platen assemblies across the width of the suction chamber. End plates 124 and 126 of the suction chamber extend between sidewalls 116 and 118 thereby sealing off the end of the suction chamber. The end plates are each provided with a means such as a pair of channels 123 which extend perpendicular to the end plates and encase upper edges of the sidewalls 116 and 118 to hold the end plates in place. In addition, the end plates 124 and 126 are each provided with extended portions 128 and 130 that extend upwardly from the end plates to a level which coincides with or is just below the level of the major surfaces of the lower platens of the adjacent platen assemblies which contact the blanket 22. In addition, the extensions 128 and 130 have edges which conform to the contour of the adjacent platens whereby the extensions 128 and 130 together with the adjacent transverse edges 132 of the platens form an inlet opening 134 of the suction chamber. The bottom wall of the suction chambers 110 is provided with an outlet 136 which leads to an exhaust header 138.

As best shown in FIG. 1, the outlets of the suction chambers 110, 112 and 114 are connected to the exhaust header 138 through conduits 140, 142 and 144. Each of these conduits is provided with a damper or valve assembly 146, 148 and 150 for regulating the flow of air and other gases from the suction chambers to the exhaust header 138.

In addition to the suction chambers 110, 112 and 114 which cooperate with the plenum chambers 82, 84 and 86 to purge gases from the blanket intermediate adjacent platen assemblies, the air removal system 48 is provided with a suction chamber 152 which is located adjacent the rear end of the platen assembly 32. The suction chamber 152 has an inlet opening 154 which lies in a horizontal plane that coincides with or is located just below the plane of the surface of the lower platen of the platen assembly 32 which contacts the blanket 22. This inlet opening 154 is provided with a perforated cover to support the blanket 22 as it passes over the suction chamber 152. The suction chamber 152 is provided with an outlet 156 that communicates through a conduit 158 with the exhaust header 138. The conduit 158 is provided with a damper or valve assembly 164 for regulating the flow of air from the suction chamber 152 to the exhaust header 138. This suction chamber draws air from the ambient surroundings down through the blanket 22 to further purge any remaining gases from the blanket.

The exhaust header 138 is connected to an inlet 162 of an exhaust fan 164. The exhaust fan 164 creates the vacuum within the suction chambers to thereby draw the air and gases from the blanket into the suction chambers. An outlet 166 of the exhaust fan 164 is connected to a conventional air filtration assembly 168 which removes the pollutants from the air and discharges the clean air to the atmosphere.

In operation, air is drawn in through the heater 50 and heated to the desired degree for the particular purging operation. The degree to which the air is heated varies according to the particular type of product being processed. For some products, the air is not heated at all while for other applications the air is heated up to temperatures of about 450° F. The air discharged from the supply fan 58 is then directed down through the plenum chambers 82, 84 and 86 and up through the exhaust duct 94. The amount of flow from each plenum chamber is regulated by the damper or valve assemblies 70, 72 and 74. The flow of air from the plenum chambers is generally increased as the cure of the blanket progresses and the blanket is able to withstand greater flows of air therethrough without being crushed. Consequently, the flow of air from plenum chamber 84 is generally greater than the flow of air from plenum chamber 82 and the flow of air from plenum chamber 86 is generally greater than the flow of air from plenum chamber 84. In addition, the flow of air from these plenum chambers varies according to the density of the product being cured. The greater the density of the product being cured, the greater the flow of air that the product can withstand without any detrimental effects. Consequently, it is important to be able to independently adjust the flow of air through each of the plenum chambers 82, 84 and 86. The valve assemblies 70, 72 and 74 enable the control of air from these chambers to be accurately regulated.

The flow of air and gaseous pollutants such as vapors, fumes and odors produced during the curing process of resin binder in the blanket 22 are withdrawn from the blanket intermediate the adjacent platen assemblies through the suction chambers 110, 112 and 114. The flow from each of these chambers is regulated by the damper or valve assemblies 146, 148 and 150 to coincide with the flow of air from the plenum chambers 82, 84 and 86 so that the entire output of each of these plenum chambers is drawn through the blankets to purge the blankets of their vapors, fumes, odors and other pollutants. By having the amount of air withdrawn through the suction chamber equal to or slightly greater than the discharge from the corresponding plenum chamber, the escape of any gaseous pollutants to the surroundings is prevented. The flow of air from the suction chamber 152 is regulated by the damper of valve assembly 164 to get the desired flow of ambient air through the blanket as it exits from the last platen assembly. The output of all of the suction chambers is channeled through the header 138 to the exhaust fan 164 which then discharges the gases to the air filter 168 for filtration.

While not shown, the plenum chambers and/or the suction chambers can be provided with plates for adjusting the widths of the openings 98 and 134 to accommodate blankets of different widths. The plates can be mounted at the ends of the openings of the chambers so that the plates can be slid in and out to adjust the widths of the openings.

What is claimed is :

1. In an apparatus wherein a binder impregnated uncured fiber glass blanket is passed through at least two spaced-apart separate curing assemblies which cure the blanket and each have opposing surfaces that contact major surfaces of the blanket, the improvement comprising:

a purging system for removing gaseous pollutants produced by the curing process comprising purging means located intermediate said heated curing assemblies for preventing the escape of gases from the blanket to the surroundings and for drawing off said gases for disposal as the blanket passes between the spaced-apart curing assemblies, said purging means including a suction chamber, said suction chamber having an inlet opening extending the width of the blanket and an outlet opening, said inlet opening being located intermediate said curing assemblies and adjacent both said blanket and said surfaces of said curing assemblies which contact one of the major surfaces of the blanket whereby gases drawn into the suction chamber pass through the blanket, and said outlet opening being connected to an exhaust means for drawing gases from said suction chamber, and said purging means including a plenum chamber, said plenum chamber having an inlet opening connected to means for supplying air to said plenum chamber, and said plenum chamber having an outlet opening extending the width of the blanket which is located intermediate said curing assemblies and adjacent both said blanket and said surfaces of said curing assemblies which contact the other of said major surfaces of the blanket.

2. An improvement as claimed in claim 1 wherein: said curing assemblies include heated platens which contact the surfaces of the blanket to effect the cure of the blanket.

3. In a method of curing and controlling the thickness of a binder impregnated fiber glass blanket by passing the blanket through a series of spaced-apart separate curing assemblies which progressively cure the blanket improvement comprising:

purging gaseous pollutants produced in the curing process by preventing the escape of gases from the blanket intermediate the curing assemblies to the surroundings and by drawing off said gases from the blanket as it passes intermediate said curing assemblies, removing the pollutants from the gases, and discharging the gases after the pollutants have been removed, said purging including supplying air to one major surface of the blanket and drawing the air supplied through the blanket at a rate substantially equal to the supply rate as the blanket passes intermediate the curing assemblies.

4. An improvement as claimed in claim 1 and further comprising:

heater means for heating air supplied to said plenum chamber.

5. An improvement as claimed in claim 1 and further comprising:

said apparatus comprising a series of three or more curing assemblies, and said purging means including a suction chamber and a plenum chamber intermediate each pair of said curing assemblies.

6. An improvement as claimed in claim 5 and further comprising:

heater means for heating air supplied to said plenum chamber.

7. An improvement as claimed in claim 5 and further comprising:

regulating means for independently regulating the flow of air to each of said plenum chambers.

8. An improvement as claimed in claim 5 and further comprising:

regulating means for independently regulating the flow of gases from each suction chamber.

9. An improvement as claimed in claim 5 and further comprising:

a suction chamber means located downstream of and adjacent the last curing assembly of the series for drawing ambient air through the blanket.

10. An improvement as claimed in claim 1 and further comprising:

filter means for filtering gases drawn off said blanket.

11. An improvement as claimed in claim 3 and further comprising:
supplying heated air to the one major surface of said blanket.

12. An improvement as claimed in claim 3 and further comprising:
increasing the supply rate of the air to the blanket and the drawing rate of the air through the blanket as the blanket passes between succeeding curing assemblies and as the cure of the blanket progresses.

13. An improvement as claimed in claim 3 comprising:
effecting the cure of said blanket in said curing assemblies by passing said blanket between heated platens.

* * * * *